(12) United States Patent
Nicolai

(10) Patent No.: US 9,435,382 B2
(45) Date of Patent: Sep. 6, 2016

(54) SHAFT/HUB CONNECTION ELEMENT WITH ELASTIC CENTERING ELEMENT

(71) Applicant: THE GATES CORPORATION, Denver, CO (US)

(72) Inventor: Karlheinz Nicolai, Lubbrechsten (DE)

(73) Assignee: Gates Corporation, Denver, CO (US)

( * ) Notice: Subject to any disclaimer, the term of this patent is extended or adjusted under 35 U.S.C. 154(b) by 79 days.

(21) Appl. No.: 14/375,753

(22) PCT Filed: Jan. 25, 2013

(86) PCT No.: PCT/US2013/023068
§ 371 (c)(1),
(2) Date: Jul. 30, 2014

(87) PCT Pub. No.: WO2013/116091
PCT Pub. Date: Aug. 8, 2013

(65) Prior Publication Data
US 2015/0016880 A1    Jan. 15, 2015

(30) Foreign Application Priority Data

Feb. 1, 2012 (DE) .......................... 10 2012 001 891

(51) Int. Cl.
| | | |
|---|---|---|
| *F16D 41/12* | (2006.01) | |
| *F16D 1/116* | (2006.01) | |
| *B62M 9/06* | (2006.01) | |
| *F16H 57/00* | (2012.01) | |

(52) U.S. Cl.
CPC ............... *F16D 1/116* (2013.01); *B62M 9/06* (2013.01); *F16H 57/00* (2013.01); *Y10T 403/7045* (2015.01)

(58) Field of Classification Search
CPC ...... F16D 41/069; F16D 41/12; F16D 41/28; F16D 41/30; B60B 27/023; B60B 27/047; B62M 11/14; B62M 11/16; B62M 11/18
See application file for complete search history.

(56) References Cited

U.S. PATENT DOCUMENTS 4,125,074 A * 11/1978 Sato ...................... B65C 11/004
                                                    101/228
4,570,769 A *  2/1986 Isaka ...................... F16D 41/12
                                                    192/107 T (Continued)

FOREIGN PATENT DOCUMENTS

DE         4344151 A1     6/1995
DE    202007010448 U1     9/2007

OTHER PUBLICATIONS

European Patent Office, International Search Report PCT/US2013/023068, Mailing date Apr. 10, 2013.

*Primary Examiner* — Daniel Wiley
(74) *Attorney, Agent, or Firm* — Jeffrey A. Thurnau, Esq.; Paul N. Dunlap, Esq.

(57) ABSTRACT

A shaft/hub connection for vehicles or for use in drive systems with a cylinder-shaped shaft component, containing elevations or depressions on the lateral surface and a hub component having a bore, including inside the bore also elevations or depressions, whereby the shaft component can be mounted inside the bore of the hub component. It is further distinguished in that inside the bore of the hub component at least 2 surfaces are arranged such that an elastic deformation of these surfaces in the radial direction is possible and inside the bore of the hub component at least 2 surfaces are arranged such that an elastic deformation of these surfaces in the radial direction is less possible. In addition, the shaft/hub connection is characterized in that the elastically deformable surfaces are connected in a materially bonding manner with the elastically less deformable surfaces.

4 Claims, 6 Drawing Sheets

(56) References Cited

U.S. PATENT DOCUMENTS

Figure 1:
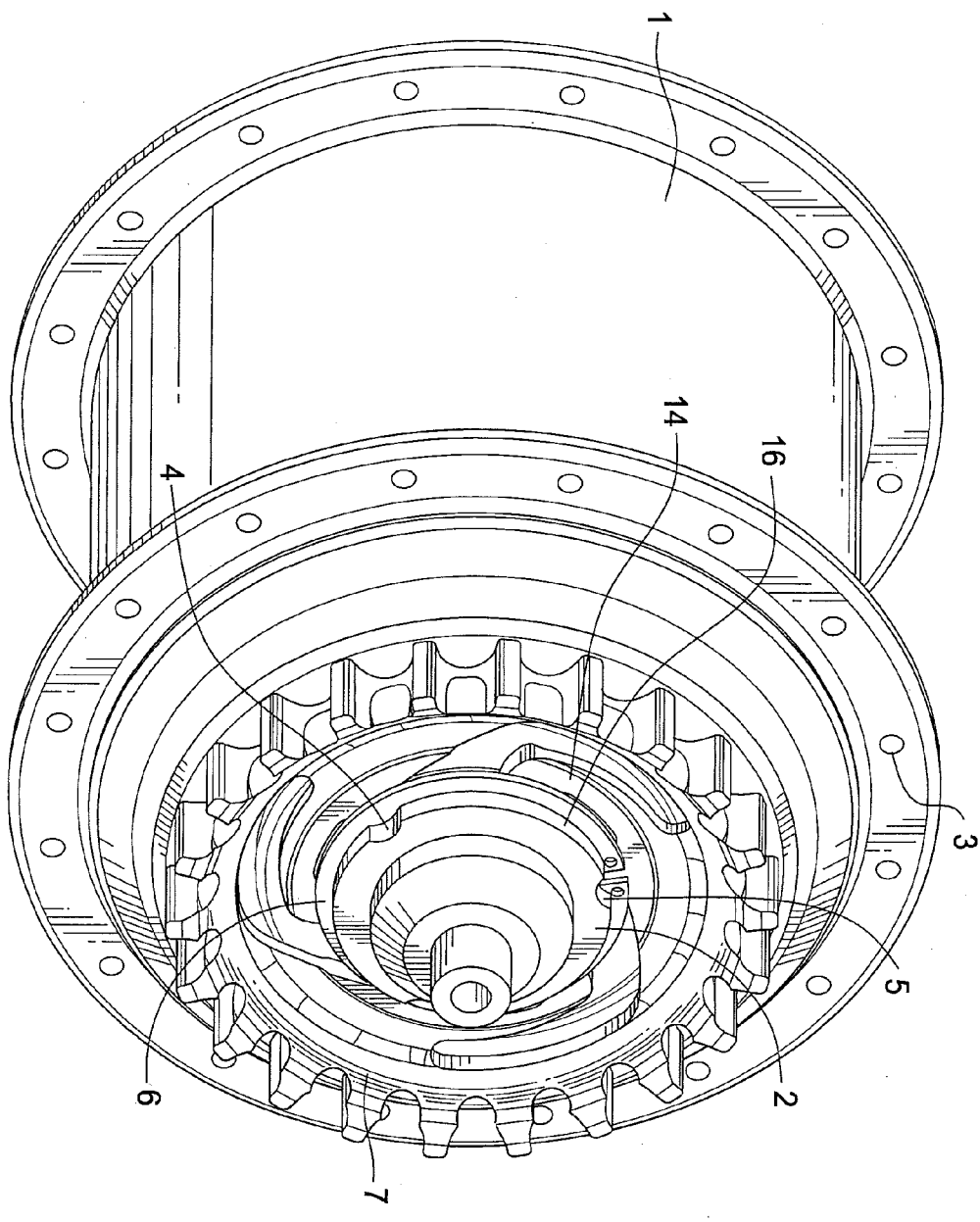

| | | | | |
|---|---|---|---|---|
| 5,000,721 A | * | 3/1991 | Williams | F16D 7/048 192/46 |
| 5,701,785 A | * | 12/1997 | Liu | F03G 1/08 185/39 |
| 2008/0058144 A1 | | 3/2008 | Oseto et al. | |
| 2010/0295265 A1 | | 11/2010 | Burdick | |

* cited by examiner

SHAFT/HUB CONNECTION ELEMENT WITH ELASTIC CENTERING ELEMENT

The invention relates to shaft/hub connections for vehicles or for use in drive systems with a cylinder-shaped shaft component, containing elevations or depressions on the lateral surface and a hub component having a bore, including inside the bore also elevations or depressions.

CURRENT STATE OF THE TECHNOLOGY

For the past 100 years, chain drives have become indispensable in the field of power transmission on two-wheelers. They are also used in power transmission on numerous machines. Very often, the sprockets are connected to a shaft via a form-fitting shaft/hub connection. Key connections according to DIN 6885 or spline shaft connections according to ISO 14 shall be mentioned as examples. In general, these and other connections work with local material elevations and depressions with regard to a cylinder-shaped connection surface. In technical jargon, these local material elevations and depressions are often referred to as tongues and grooves or dog tooth. However, a play-free fit as the centering between shaft and hub is important for the proper function of these connections. Under load and if tolerances between the shaft and hub are too large, it would lead to wobbling between the two components. This is considered negative for the function. In general, high-quality fits are relatively expensive to manufacture using machining processes. This should be considered a disadvantage if one has to manufacture low-cost mass products.

The novelty to be described below can be used in many product sectors and is particularly suitable in terms of cost-effective production capabilities for use in drive systems in consumer goods, bicycles or motorcycles. For this reason, the functional description of the shaft/hub connection element with elastic centering elements shall be carried out using a bicycle as an example.

Over the past forty years, the chain drive with the possibility of switching on the rear axle has become prevalent for bicycles. In this configuration, a distinction is made between the derailleur and the hub gears. The structure of both systems is known in the art and, for example, described in DE 10 2004 045 364 B4 with advantages and disadvantages.

The chain sprocket is usually thin on the known shaft/hub connections on affordable bikes with hub gears. This two to three millimeters wide component is usually a stamped part made of steel and has three or more drive cams or teeth which engage in grooves which are located on the input shaft of the hub gear. The fit between these two components is usually formed as a clearance fit. This is necessary in order to employ low-cost manufacturing methods such as sintering, casting or stamping. To prevent the sprocket from moving axially on the input shaft, it is typically held in position by a lock washer. Rear hubs in this known embodiment are presented in DE 20 2009 5 904 U1 or DE000060224919T2 or EP000002008927B1, for example.

In recent years, many chain drives in automotive technology and the general drive technology were replaced by toothed belt drives. Advantages worth mentioning are lower weight, longer service life, less noise and operation without lubricant. Especially in the field of bicycles with hub gears, toothed belt drives according to EP000002289792A1, CA000002749293A1 and US000007854441B2 are becoming more prevalent. Because a functioning toothed belt drive requires a defined preload of the belt, a wobbling toothed belt disk on the rear hub would not be able to maintain a constant tension. If the toothed belt disk is not centered and tightly fixed on the rear hub, there would be operating noises because the hole of the toothed belt disk would continuously roll on the shaft. The consequence would be squeaking and creaking noises. Rear hubs with hub gears from all major manufacturers have a centering diameter, which, due to low-cost manufacturing methods, has tolerances of plus/minus 0.15 millimeters in the area of the input shaft. If one intends to manufacture inexpensive toothed belt disks without machining by sintering or investment casting, then the manufacturing process requires also bore tolerances in the area of plus/minus 0.15 millimeters. Considering the boundary conditions of the assembly capabilities, both components can thus be combined only with a certain play. This demonstrates the problem of deficient centering when using toothed belt disks with a spline shaft profile in combination with inexpensively available hub gears.

The invention therefore improves the centered seat of a spline shaft profile.

Task:
Based on this problem, the shaft/hub connections described above shall be improved.

To solve the problem, a shaft/hub connection of the generic kind is characterized in that
 a) Inside the bore of the hub component at least 2 surfaces are arranged such that an elastic deformation of these surfaces in the radial direction is possible and
 b) Inside the bore of the hub component at least 2 surfaces are arranged such that an elastic deformation of these surfaces in the radial direction is less possible.
 c) The elastically deformable surfaces are connected in a materially bonding manner with the elastically less deformable surfaces.

By the fact that inside the bore of the hub component at least 2 surfaces are arranged such that an elastic deformation of these surfaces in the radial direction is possible, the hub can fit tightly to the shaft even with large manufacturing tolerances. By the fact that at the same time inside the bore of the hub component at least 2 surfaces are arranged such that an elastic deformation of these surfaces in the radial direction is less possible, a good form-fitting power transmission is achieved. If additionally, elastic deformable surfaces are still connected in a materially bonding manner with the elastically less deformable surfaces, the component can be manufactured easily and exhibits robust properties. When the shaft/hub connections are characterized in that the elastically deformable surfaces form a diameter which in the unassembled state is smaller than the shaft diameter, the centering properties can be optimized. If the shaft/hub connections are characterized in that the sum of the elastically deformable surfaces and the elastically less deformable surfaces that contact the shaft on the cylinder-shaped lateral surface are smaller than the covered lateral surfaces of the shaft itself, then the centering function can be achieved even with relatively thin hubs and large tolerances. If the novel shaft/hub connections are characterized in that the elastic deformability of the surfaces is achieved by bending beams that are shaped such that they are oriented tangential to the shaft, then the component can be manufactured inexpensively by punching or sintering. Additionally, weight is saved on the component if the profile circumference of the bore of the hub is greater than the profile circumference of the shaft.

EXEMPLARY EMBODIMENT

Exemplary embodiments of the invention shall be explained in greater detail based on a drawing. The figures show:

FIG. 1: A rear hub of a bicycle without spokes or rim.

Figure 2:
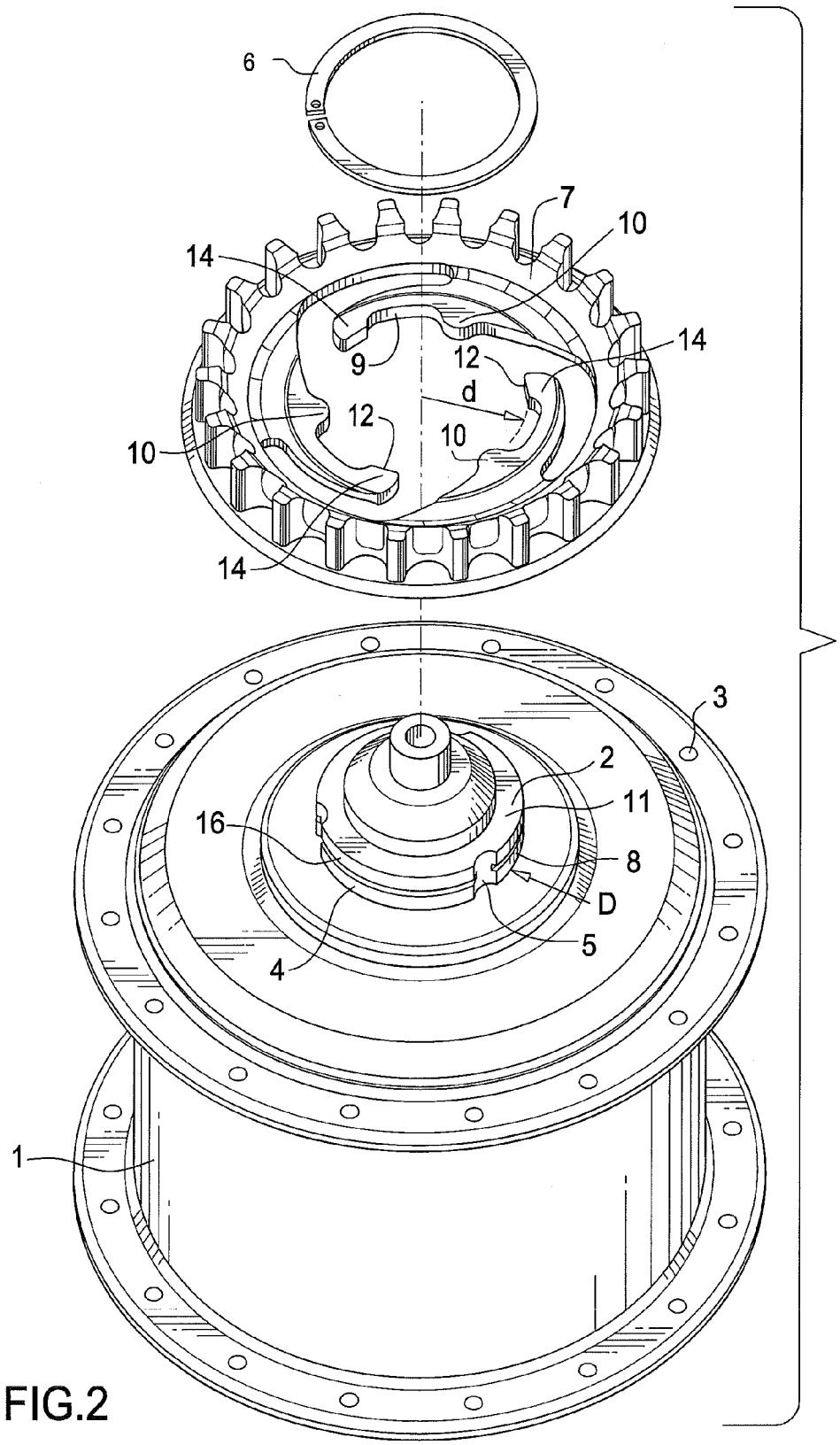

FIG. 2: A rear hub of FIG. 1 in the disassembled state.

Figure 3:
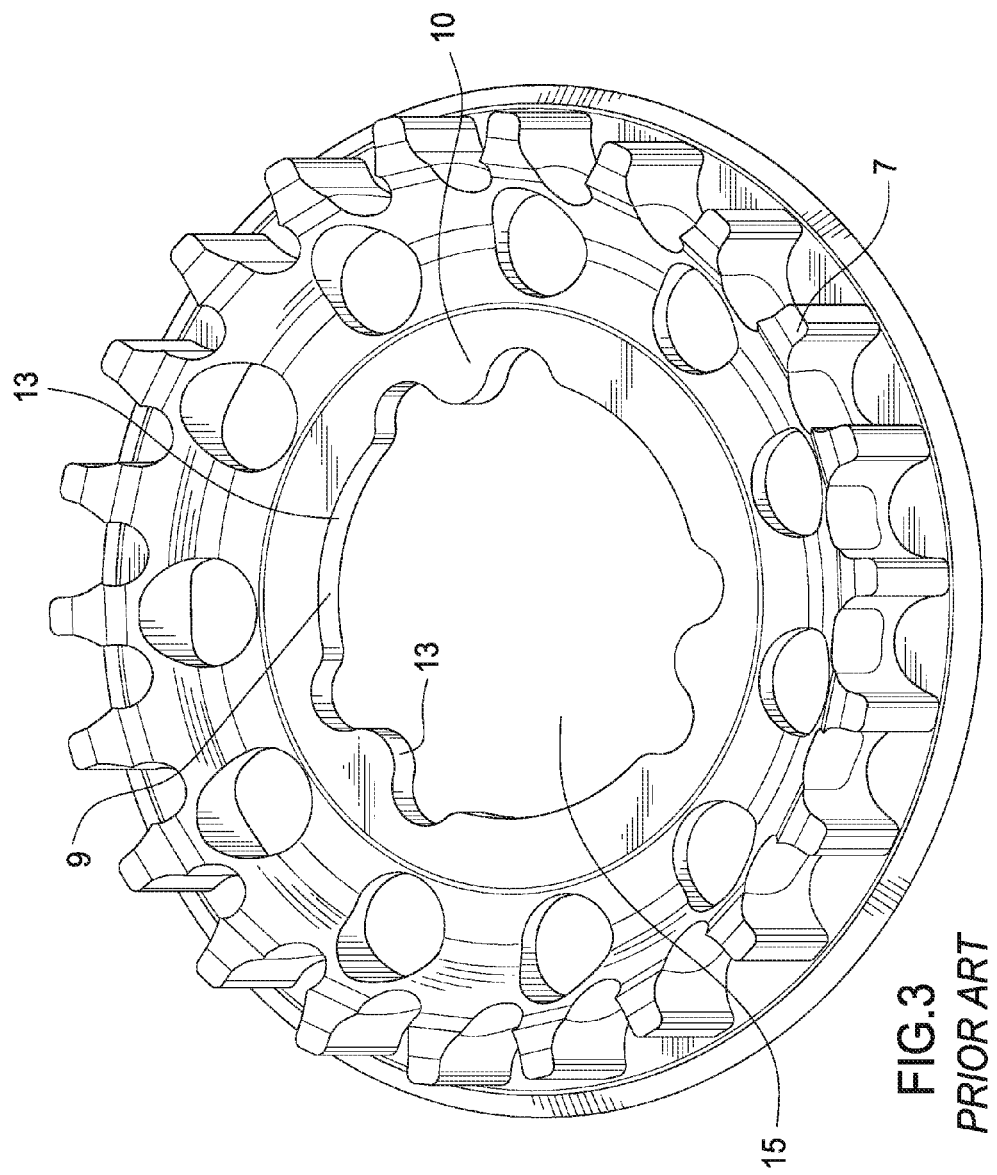

FIG. 3: An isometric presentation of a toothed belt disk according to the state-of-the-art.

Figure 4:
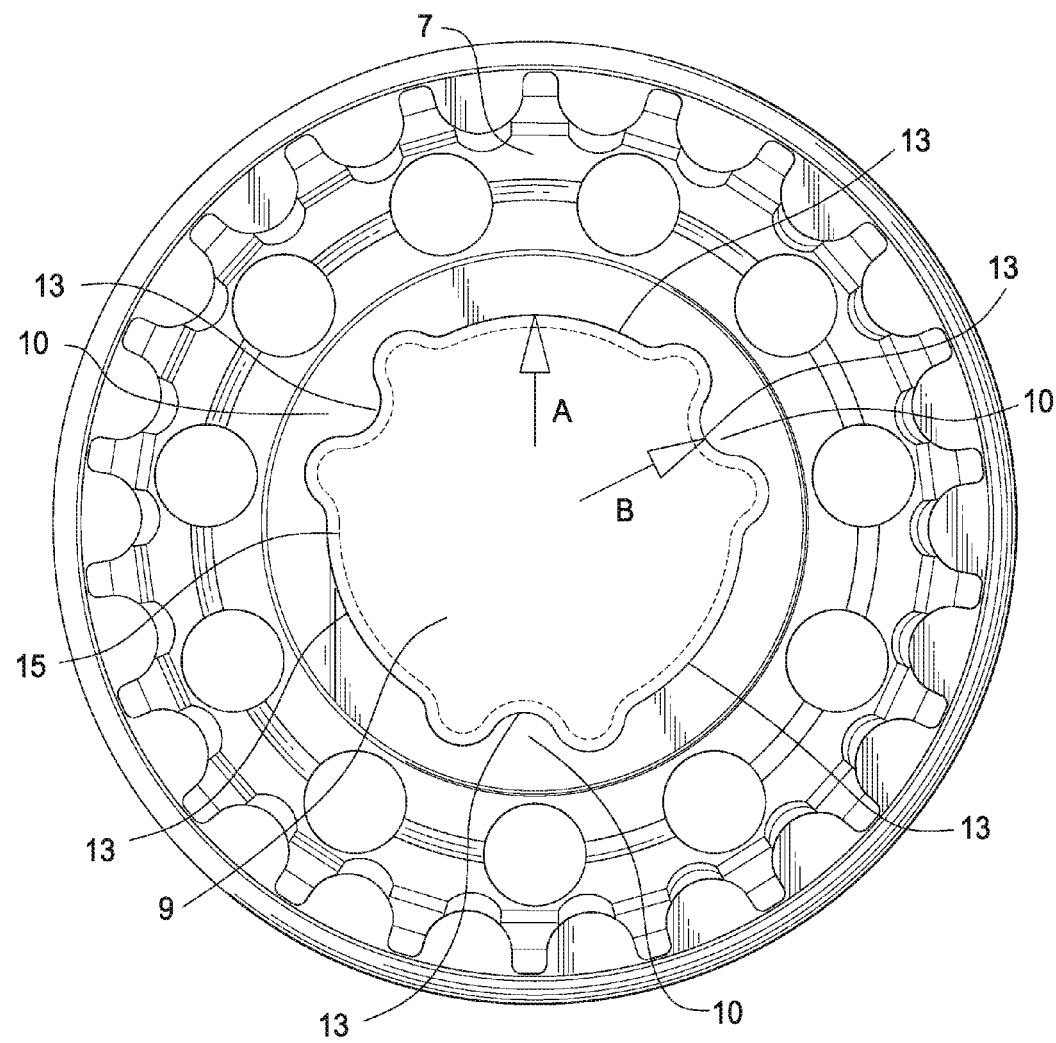

FIG. 4: A side view of a toothed belt disk according to FIG. 3.

Figure 5:
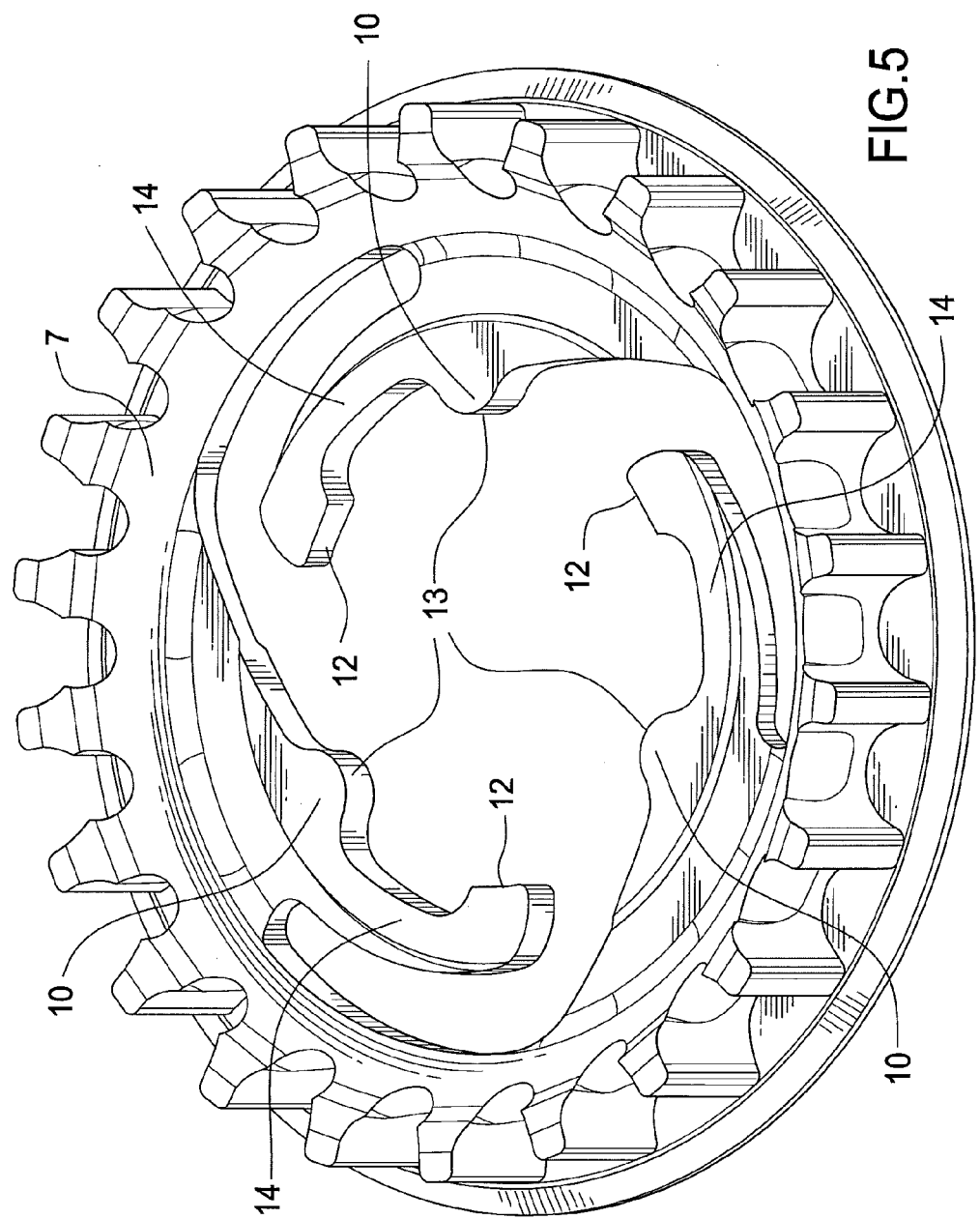

FIG. 5: An isometric presentation of a toothed belt disk according to the novelty.

Figure 6:
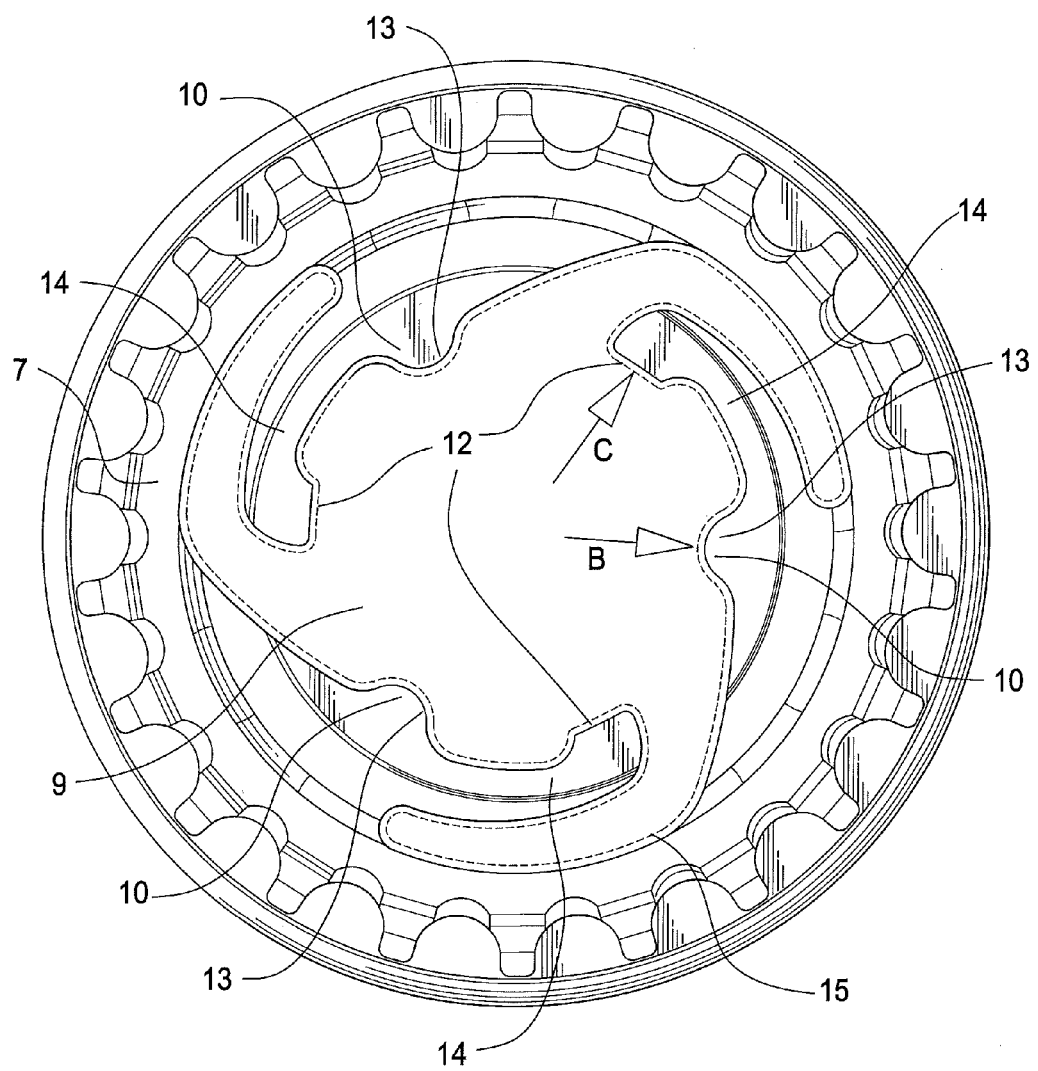

FIG. 6: A side view of a toothed belt disk according to FIG. 5.

It should be noted here that in all Figures, the shaft/hub connection element with elastic centering elements by way of example is arranged inside a toothed belt disk.

FIG. 1 shows a rear hub 1 of a bicycle without spokes or rim. The torques of the driver are transmitted to the toothed belt drive via the foot pedal. The toothed belt transfers the torques to the toothed belt disk 7, which in turn drives the input shaft of the hub gear 2.

This introduces the torques via a shaft/hub connection 4 into the hub gear. The not shown bicycle rim with tire is driven by the rear hub 1 via the spokes that are mounted inside the spoke holes 3. This is the common structure on a bicycle. It can be seen that the toothed belt disk 7 is held axially on the input shaft of the hub gear 2 via a lock washer 6 and can transmit the torques via three grooves 5. The cylinder-shaped lateral surface 16 provides for correct centering of the toothed belt disk 7 on the input shaft 2. However, correct centering is only possible if the bore of the toothed belt disk 7 is seated without play in relation to the cylinder-shaped lateral surface 16. In terms of the novelty, this is achieved in that in radial direction elastically movable bending beams 14, the bore surfaces always exert pressure against the cylinder-shaped lateral surface 16 and in this manner are able to bridge manufacturing tolerances.

FIG. 2 shows a rear hub 1 of a bicycle in a disassembled state without spokes or rim. The input shaft of the hub gear 2 has at a shaft component 11 a shaft/hub connection 4, which transmits the torques of the toothed belt disk 7 into the hub. Here, the toothed belt disk 7 is shown in an embodiment according to the invention. The lock washer 6 is shown in a disassembled state. The grooves 5 inside the input shaft of the hub gear 2 are shaped such that the elevations 10 inside the bore 9 of the toothed belt disk 7 can accurately engage therein. In this presentation, the novelty has inside the bore 9 of the hub component three surfaces 12, which are arranged such that an elastic deformation of these surfaces in the radial direction is possible. In this embodiment, the toothed belt disk 7 forms the hub component. In this embodiment, the elastic deformability of these three surfaces is achieved through three bending beams 14, which are shaped such that they form the bore 9 with the diameter "d". In an advantageous embodiment of this invention, this diameter "d" of the disassembled toothed belt disks is always smaller than the shaft diameter "D" of the lateral surface 8 created by the tolerance field. In this constellation, the three surfaces 12 of the toothed belt disk 7 can deform elastically during assembly and create precise centering. The bending beams 14 of the novelty thus form a connection in a materially bonding manner between the surface 12, which can deform elastically radially and the surface 13, which is responsible for the form-fitting torque transmission and cannot deform elastically radially. In terms of the novelty and in exemplary fashion, the bending beams 14 with the elastic surfaces 12 form the elastic centering elements.

FIG. 3 is an isometric presentation of the embodiment of a toothed belt disk 7 in an disadvantageous embodiment according to the state-of-the-art. The bore 9 is manufactured with a clearance fit with respect to the input shaft 2 of FIG. 2. In terms of radial deformability, the surfaces 13 can be considered rigid and relatively inelastic. The areas 10 with the three dog teeth are rigid and inelastic. This rigidity of the dog elevations is important for a good form-fitting torque transmission.

FIG. 4 is a side view of the embodiment of a toothed belt disk 7 in a disadvantageous embodiment according to the state-of-the-art. The bore 9 is manufactured with a clearance fit with respect to the input shaft 2 of FIG. 2. The spline shaft profile 15 is represented here by a dashed line.

In terms of radial deformability, the surfaces 13 can be considered rigid and relatively inelastic. The radial direction of movement of the inelastic surfaces 13 is shown with an arrow "A". The areas 10 with the three dog teeth are rigid and inelastic as well. This rigidity of the dog elevations is important for a good form-fitting torque transmission. Here, the radial direction of movement of the inelastic surfaces 13 is shown with an arrow "B".

It is clearly apparent that the total area of the bore 9 at the spline shaft profile 15 matches the cylinder-shaped lateral surface 16 with the grooves 5 from FIG. 1.

FIG. 5 is an isometric presentation of the embodiment of a toothed belt disk 7 in an advantageous embodiment according to the novelty. The bore 9 contacts cylinder-shaped lateral surface 16 with the grooves 5 from FIG. 1 only with the surfaces 12 and surfaces 13. Only these elevations 10 with the surface 13 are made with a clearance fit with respect to the input shaft 2 of FIG. 2. In this form, the surfaces 12 can be considered elastic in terms of radial deformability, because they are connected to the rigid remaining body of the toothed belt disk 7 via a bending beam 14. Abstractly formulated, elastically deformable surfaces 12 of a bore 9 are connected in a materially bonding manner with elastically non-deformable surfaces 13. Since every body exhibits a certain elastic deformation under force, one can also formulate as follows: Abstractly formulated, elastically deformable surfaces 12 of a bore 9 are connected in a materially bonding manner with elastically less deformable surfaces 13. Furthermore, the novelty can be described with the following properties: The sum of the elastically deformable surfaces 12 and the elastically less deformable surfaces 13, which contact the input shaft 2 on the cylinder-shaped lateral surface, are always smaller than the lateral surface 16 itself from FIG. 1.

FIG. 6 shows a side view of an embodiment of a toothed belt disk 7 in an exemplary embodiment of the invention. The surfaces 13 of the bore 9 are designed as a dog tooth 10 and manufactured with a clearance fit relative to the grooves 5 of the input shaft 2 from FIG. 1 or FIG. 2. The spline shaft profile 15 is represented here by a dashed line. Comparing the dashed lines in FIG. 6 with the dashed line in FIG. 4, it clearly shows that the spline shaft profile of the novelty exhibits a longer profile circumference. Not the entire surface of the bore 9 contacts the cylinder-shaped lateral surface 16 from FIG. 2. If one quantifies this circumstance of the novelty, one arrives at the statement that the profile circumference of the bore is at least 25% longer than the surface of the shaft, which is covered by the bore profile. In terms of radial deformability, the surfaces 13 can be considered rigid and relatively inelastic in this form. Here, the radial direction of movement of the inelastic surfaces 13 is shown with an arrow "B". In this form, the surfaces 12 can be considered elastic in terms of radial deformability, because they are connected to the rigid remaining body of the toothed belt disk 7 via a bending beam 14. The radial direction of movement of the elastic surfaces 12 is shown with an arrow "C". In other embodiments, the advantages of the novelty can also be achieved via twice supported bending beams.

LIST OF REFERENCE CHARACTERS

1 Rear hub
2 Input shaft hub gear
3 Spoke holes
4 Shaft/hub connection
5 Grooves, depressions
6 Lock washer
7 Toothed belt disk
8 Lateral surface
9 Bore
10 Elevation, dog tooth
11 Shaft component
12 Surface, elastically deformable
13 Surface, elastically non-deformable
14 Bending beam
15 Spline shaft profile
16 Cylinder-shaped lateral surface.

I claim:

1. A shaft-hub connection for vehicles for use in drive technology comprising:
　a cylinder-shaped shaft component, which has a plurality of longitudinally extending elevations or depressions formed on an outer lateral surface thereof; and
　a hub component with a bore therethrough configured to receive the shaft component therein, the hub comprising a plurality of bending beams extending inwardly into the bore and substantially tangential to the outer lateral surface of the shaft component; wherein each bending beam comprises:
　　a proximal portion connected to the hub,
　　a distal portion opposite the proximal portion, and
　　a medial portion therebetween,
　　wherein a first surface is formed at each medial portion which engages with a respective one of the elevations or depressions on the outer lateral surface of the shaft component; and
　　wherein a second surface is formed at each distal portion which deformably engages the outer lateral surface of the shaft component.

2. The shaft-hub connection as set forth in claim 1, characterized in that the respective second surfaces of the bending beams form a diameter, which in an unassembled state is smaller than a diameter of the outer lateral surface of the shaft component.

3. The shaft-hub connection as set forth in claim 1, characterized in that a diameter formed by the first surfaces and a diameter formed by the second surfaces are each smaller than a diameter of the elevations or depressions of the outer lateral surface of the shaft component.

4. The shaft-hub connection as set forth in claim 1, characterized in that a profile circumference of the bore of the hub is larger than a profile circumference of the shaft component.

* * * * *